Feb. 10, 1970   J. R. MANGO   3,494,391
SABRE SAWS WITH 360° SWIVEL SAW BARS
Filed April 24, 1968   2 Sheets-Sheet 1

WITNESS
Nicholas Leozezak

INVENTOR.
Joseph R. Mango
BY
Marshall J. Breen
ATTORNEY

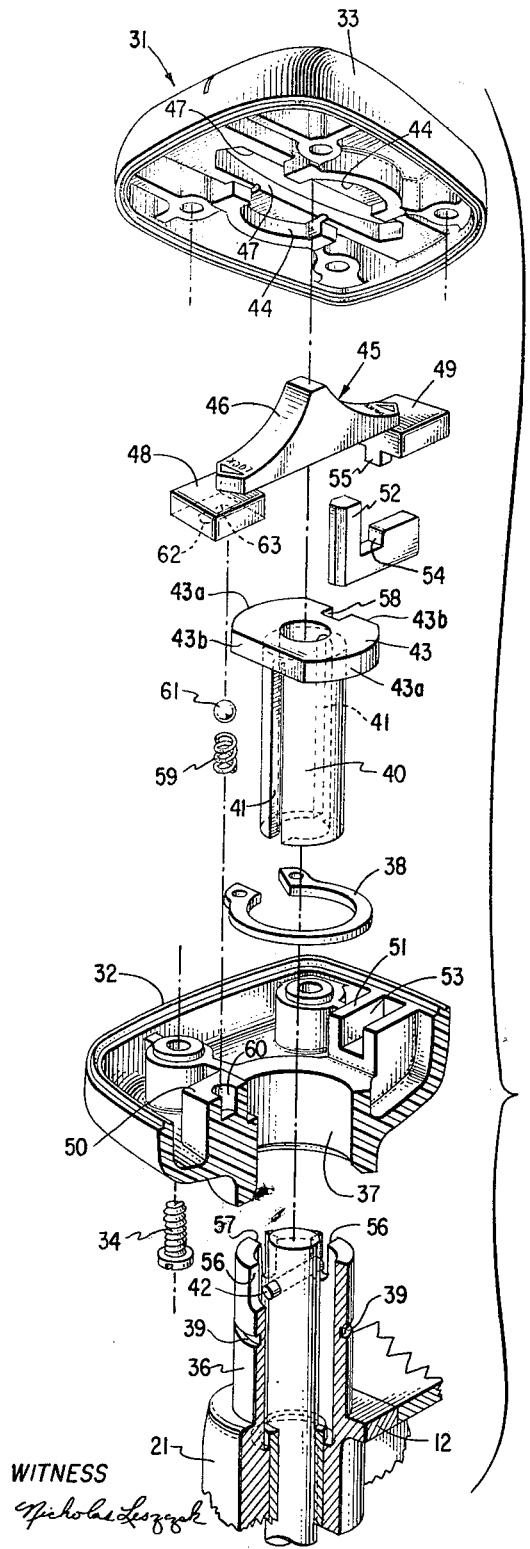

United States Patent Office 3,494,391
Patented Feb. 10, 1970

3,494,391
SABRE SAWS WITH 360° SWIVEL SAW BARS
Joseph R. Mango, Midlothian, Ill., assignor to The Singer Company, New York, N.Y., a corporation of New Jersey
Filed Apr. 24, 1968, Ser. No. 723,786
Int. Cl. B27b *19/08*
U.S. Cl. 143—68                                                    4 Claims

ABSTRACT OF THE DISCLOSURE

A sable saw is provided with means for driving the saw bar in a linear reciprocatory motion from a rotary electric motor while at the same time permitting the saw bar to be manually rotated or selectively locked in position about its own axis to set the cutting edge of the saw blade in different angularly oblique positions relative to the line of movement of the tool. A control knob journaled on the stationary housing is coupled to the saw bar by means of a slotted sleeve keyed for rotation with the saw bar by a pin fixed to the saw bar, which pin is slidable in the slotted portion of the sleeve. The sleeve is formed with shaped flanges held captive within the upper half of the control knob which is split for ease of assembly. The saw bar slides up and down within the sleeve and its angular position is controlled by the angular position of the sleeve which guides the pin, said sleeve being controlled in angular position by the knob. A slide button is operatively secured to the control knob to provide detented or keyed means for selectively locking the saw bar in its normal angular position for use as a conventional sabre saw, or for unlocking the saw bar when it is desired to manually control the position of the cutting edge as in scroll cutting. The slide button operates to insert a slidable metallic key into aligned slots formed in the flange of the sleeve and in the tool housing respectively. The key would perform the locking function upon being inserted into the slot of the housing, but by extending into the slotted sleeve flange, a more desirable metal to metal lock is obtained.

Background of the invention

While the concept of rotating a saw bar of a sabre saw about its own axis is old as shown in the Bechtold U.S. Patent No. 2,547,922, so far as I am aware, no commercially successful sabre saw having this concept has yet appeared on the market.

One reason for this is that there has not been heretofore devised an effective, convenient and economical means for controlling the angular position of a reciprocating saw bar.

The prior Bechtold device for example requires a saw bar having in one end a square bore which is difficult and costly to fabricate, and even then the locking means provided is only frictional.

Alternately, a sabre saw device of the type embodying a pin lock is described and claimed in a patent application entitled "Sabre Saw with 360° Swivel Saw Bar," Ser. No. 713,713, filed Mar. 18,1968 of which the present application is believed to be an improvement.

Summary of the invention

It is therefore an object of this invention to provide effective and conveniently operated means for selectively and manually controlling the angular position of the saw bar of a sabre saw about its own axis at all times during the cuting operation, without adding substantially to the production cost of the tool.

It is a further object of this invention to accomplish the above objective by providing a structure which does not require extensive modification of existing sabre saws and is easy to operate, reliable and economical to produce.

In attaining the objects of this invention the saw bar need be modified only to the extent of providing a single transverse guide pin and two collars to transmit reciprocatory motion from the cross head while permitting the saw bar to turn about its longitudinal axis.

In further attaining the objects of this invention, a split control knob and its associated structure are made largely of inexpensive molded parts which can be easily assembled in interfitted relation. Only the smaller parts, used to positively lock the saw bar in the selected angular position, are fabricated of metal, as it is only such parts which require strength and wear resistance provided by metal.

Other objects and advantages will be apparent from the following description of one embodiment of the invention and the novel features will be particularly pointed out hereinafter in the claims.

Figure 1:
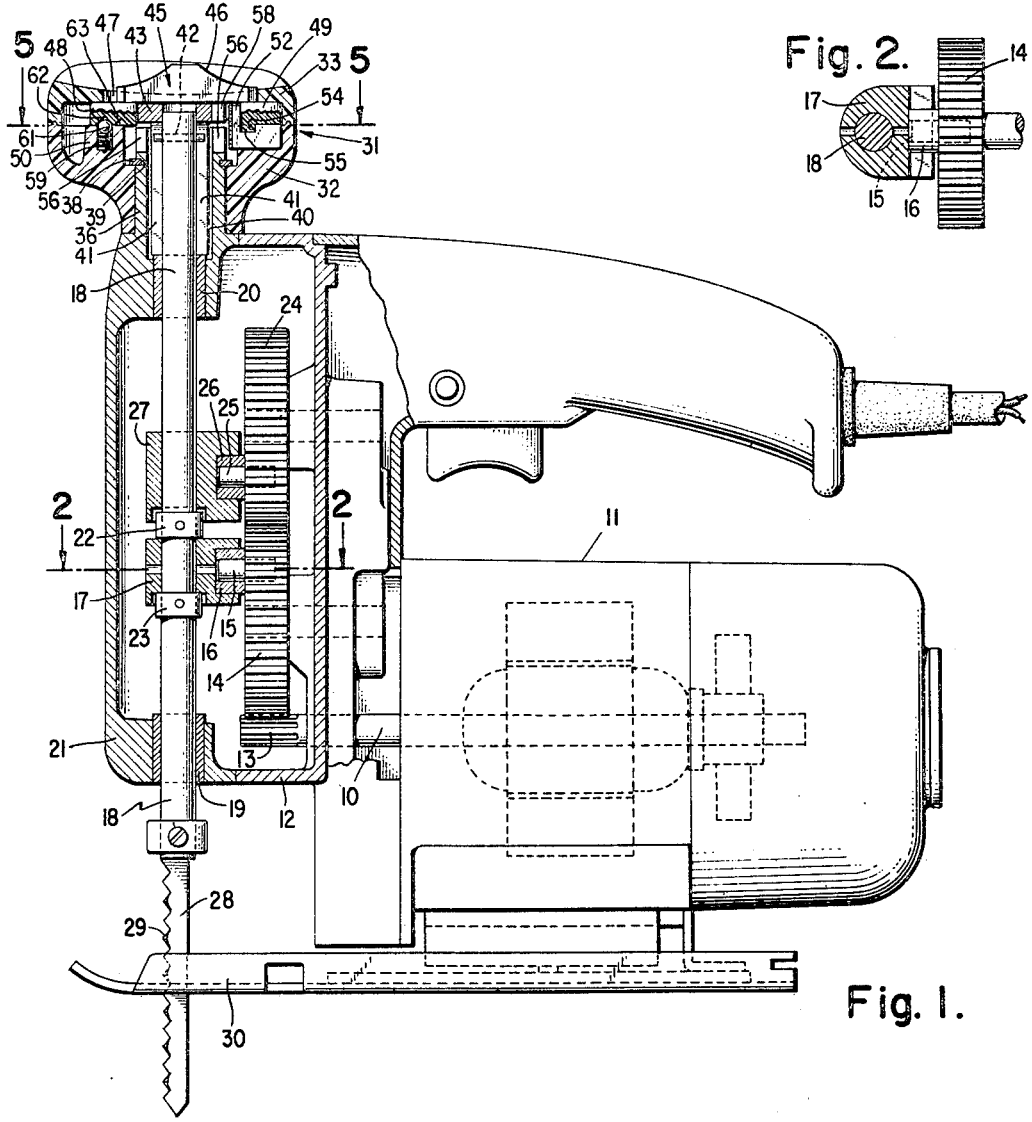
Figure 2:
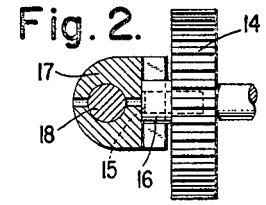
Figure 6:
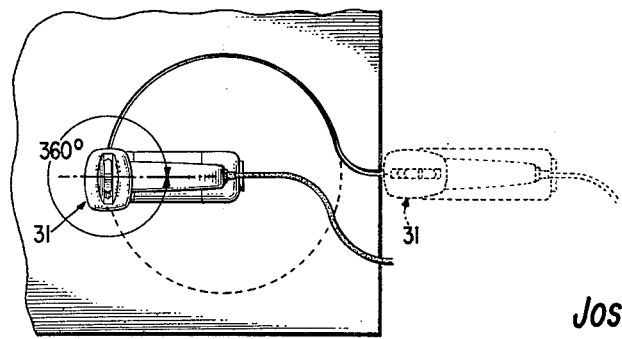

In the drawings:
FIG. 1 is a longitudinal elevation partly in section of a sabre saw illustrating an embodiment of this invention.
FIG. 2 is a sectional view taken on line 2—2 of FIG. 1.
FIG. 3 is an exploded perspective view partly in section illustrating the structural details of the control knob and associated parts.
FIG. 4 is a top plan view of the control knob.
FIG. 5 is a sectional view of the control knob taken on line 5—5 of FIG. 1.
FIG. 6 is a view illustrating the use of the sabre saw of this invention in cutting a circular disc from a workpiece.

Description of the invention

Referring now to FIG. 1 of the illustrated embodiment of the invention, a shaft 10 of a driving electric motor mounted in housing 11 extends into the gear housing 12 and is formed with a splined portion 13 which meshes with and drives a gear 14 journaled in the gear housing. The gear 14 carries an eccentric pin 15 surmounted by a roller 16 which engages the slide portion of a crosshead 17. The crosshead 17 also has a hole spaced from and perpendicular to the slide portion thereof.

A saw bar 18, which has a circular transverse cross section is free to turn about its axis within the hole of the crosshead 17 but is held axially captive by a pair of collars 22 and 23 affixed to the crosshead 17 on either side of the saw bar 18. The saw bar 18 is journaled for linear movement in bearings 19 and 20 secured in a gear housing cover 21.

A gear 24 journaled in the gear housing 12 meshes with gear 14 and by means of eccentric pin 25 and roller 26 drives an upper balancing crosshead 27 which is free to turn and slide on the saw bar 18.

From the above description, it will be seen that the motor shaft 10 drives the gear 14 which, through pin 15 and roller 16 working in crosshead 17, transmits linear axial reciprocatory motion to the saw bar 18 and drives an affixed saw blade 28 having a cutting edge 29 in a linear reciprocatory path substantially normal to the plane of a work-contacting shoe 30. As this far described, there is no structure for selectively determining the angular position of the saw bar 18 about its own axis and thus no means for presenting the cutting edge 29 of blade 28 in a predetermined angular position with respect to the work structure similar to the above, except that the crosshead is securely clamped to the saw bar, is shown and described in the Happe U.S. Patent No. 3,205,722 to which reference may be had for a more complete understanding thereof.

There will now be described structure according to this invention for selectively and manually controlling the angular position of the saw bar 18 while it is recipocating to provide the cutting strokes for the saw blade 28.

Referring to FIGS. 1 and 3, a control knob indicated generally as 31 is split for ease of assembly to form a lower half 32 and an upper half 33 which are subsequently interfitted to contain internal parts to be described and are secured together finally by means of self tapping screws 34.

The gear housing cover 21 is formed with a hollow cylindrical hub extension 36 within which the upper end portion of the saw bar 18 may freely reciprocate. The lower half 32 of the knob is formed with an apertured shank portion 37 which is slidably received on the extension 36 for journaling the knob 31 in the tool housing. A split snap-ring 38 received in a groove 39 retains the knob 31 on the extension 36.

A metal cylindrical sleeve 40 having diametrically positioned slots 41 is slidably received on the end portion of saw bar 18 with a metal pin 42 secured to the saw bar and in slidable guiding engagement with the slots 41. The pin 42 is preferably secured to the saw bar 18 in such a position that its axis lies in the plane of the blade 28.

The sleeve 40 seats freely within the hollow extension 36 with its lower end substantially abutting the bearing 20.

A shaped flange 43 is formed on the sleeve 40 to be received in a correspondingly shaped seat 44 (see FIG. 5) formed in the upper knob half 33 to lock the sleeve 40 for rotation with the knob 31. As best seen in FIG. 3 the flange 43 has diametrically opposed arcuate edges 43a and flat edges 43b which facilitate the press-fit assembly thereof.

A slide button, indicated generally as 45, is formed with raised finger portion 46 which projects through a slot 47 formed in the knob half 33 to a point substantially flush with the uppermost side of knob portion 33, and is slidable in the slot 47. Pads 48 and 49 formed on the slide button 45 bear against boss portions 50 and 51 respectively formed on the lower knob half 32.

A metal key 52 of the form shown best in FIG. 3 is slidably received in a slot 53 formed in knob half 32. A notched portion 54 of the key 52 engages with a downward projection 55 formed on pad 49 so that the key 52 is locked for sliding movement with the slide button 45.

The extension 36 is formed with two pairs of diametrically spaced notches 56 and 57, respectively, which are aligned along the quadrant lines of the axis of the tool. A notch 58 is formed in the flat edge 43b of the flange 43 adjacent the narrow width side of the knob 31. The notch 58 is aligned with the diametrical axis of the slots 41. The flange 43 is captive in the knob 31 in a position such that the notch 58 is always aligned with the slot 53 in which the key 52 slides. Thus, when the knob 31 is turned to bring the notch 58 into alignment with the notch 56, the key 52 may be inserted into both said notches 56 and 58 by manipulation of the slide button 45 to effectively lock the saw bar 18 in its normal angular position for forward cutting as a regular sabre saw. This is the position of the parts indicated in FIGS. 4 and 5.

The slide button 45 may be moved to its unlocked position, in which case the key 52 is retracted from engagement with notches 56 and 58 as seen in FIG. 1 and the saw bar 18 may then freely be turned by means of the knob 31 to provide any desired angular position of the blade 28.

To provide detented positions corresponding to the locked and unlocked condition of the button 45, a spring 59 seated in a pocket 60 formed in lower knob half 32 presses a ball 61 into spaced depressions 62 and 63 respectively formed in the pad 48.

Inasmuch as the position of the saw bar 18 and thus the saw blade 28 is always controlled by the position of the control knob 31, it may be provided with a fixed index mark 64 as seen in FIG. 4 to indicate at all times the direction in which the cut is being made and thus assist the operator in following any desired pattern.

From the above it will be evident that, except for the conventional hardware fastening elements, the only special parts required to be made of metal are the sleeve 40, the pin 42 and the key 52.

All the remaining parts may be readily made of an inexpensive molded plastic material without compromising the effective operation of the device. For example, the key 52 when in place provides a strong direct metal-to-metal lock of the sleeve 40 with respect to the tool and no plastic material is depended on for transmitting torque to the tool body. Upon the saw bar 18 being selectively turned the heavy section of plastic material surrounding the seat 44 is sufficiently strong to transmit torque from the control knob 31 to the sleeve 40 and through pin 42 to the saw bar 18. The only parts subjected to continuous frictional wear are the saw bar 18, the pin 42 and the sleeve 40 which are all made of metal for long useful life.

While there has been illustrated in this embodiment only two pairs of notches 56 and 57, respectively for four selected 90° spaced apart locked positions of the saw bar 18, it will be apparent to those skilled in the art that other notches may be made in the extension 36 to provide any desired locked positions for the saw bar.

FIG. 3 is an exploded assembly drawing of the control knob 31 described hereinbefore.

It will be noted that, with the present construction, the free end of the saw bar 18 extends substantially into the body of the control knob 31 even in its lowest position of reciprocation. This provides a close-coupled rigid control of the needle bar by the knob and results in more accurate control of the saw blade 28 in following a desired pattern contour.

FIG. 6 illustrates a sabre saw embodying this invention being used as a scroll saw to cut a circular disc from a work piece. If a conventional sabre saw, i.e., one not having the swiveling saw bar feature of this invention, is used to follow a curved pattern of this kind, it is necessary to orient the entire tool to follow the curve. This involves the controlled guiding and turning of considerable mass from a position offset from the cutting axis of the tool which becomes increasingly difficult as the radius of curvature becomes small relative to the tool dimensions.

With the emphasis now being placed, by the attributes of this invention, on guiding the saw bar from a position directly above the cutting axis of the tool and requiring only the turning of the small mass of the saw bar itself it now becomes possible to readily and accurately cut intricate patterns with a portable power tool of large capacity. With the full 360 degree swiveling of the saw bar quite independently of the rest of the tool body, it is only necessary to use the single control knob 31 to guide the cutting edge 29 as desired and let the body of the tool assume any angle that it may take. Also, the use of a slide button 45 permits operator actuated selective locking or releasing of the angular position while the tool is operative and cutting, if desired. Thus, it is possible to make cuts with the swiveling feature which would not even be possible with any other type of conventional sabre saw.

It will be understood that various changes in the details, materials, arrangements of parts and operating conditions which have been herein described and illustrated in order to explain the nature of the invention may be made by those skilled in the art within the principles and scope of the invention as expressed in the claims.

Having thus set forth the nature of the invention, what I claim herein is:

1. In a power operated portable saw having a housing and a saw bar including driving means for reciprocating the saw bar along a linear axis while permitting the saw bar to freely be rotated about said axis, means controlling the rotation of said saw bar comprising:
- (a) a sleeve slidable on the saw bar and formed with a longitudinal slot parallel to the axis,
- (b) a pin fixed to the saw bar transversely of the axis and slidably engaged with the slot,
- (c) a control knob journaled on a hub extension of the housing for rotation thereof about the axis,
- (d) a first notch formed in said housing extension,
- (e) flange means securing the sleeve to the knob for rotation therewith and formed with a second notch,
- (f) a key slidable in the knob in a path transverse to the axis to engage the first and second notches when in alignment, and
- (g) detented means carried by the knob and externally accessible for moving the key into and out of its engaged position with the notches.

2. The combination of claim 1 wherein:
- (a) the control knob is split along a transverse plane to form first and second knob halves,
- (b) a snap ring secured to the hub extension retains the first knob half in journaled position on the extension,
- (c) the second knob half is secured to the first knob half to form an enclosure for the slidable key, and
- (d) the means for moving the key is externally operable through a slotted portion of the second knob half.

3. The combination of claim 1 wherein:
- (a) the hub extension is formed as a hollow cylinder coaxial with the saw bar, and
- (b) the sleeve is freely seated within the hub extension.

4. The combination of claim 1 wherein:
- (a) the free end of the saw bar extends substantially within the body of the knob in all operating positions.

References Cited
UNITED STATES PATENTS

| | | |
|---|---|---|
| 2,547,922 | 4/1951 | Bechtold. |
| 2,588,477 | 3/1952 | Briggs. |
| 2,601,877 | 7/1952 | Van Dam _____ 143—73 |

DONALD R. SCHRAN, Primary Examiner